Oct. 8, 1940.　　　　L. S. WILLIAMS　　　　2,217,244
WEIGHING SCALE
Filed Nov. 10, 1939　　　　2 Sheets-Sheet 1
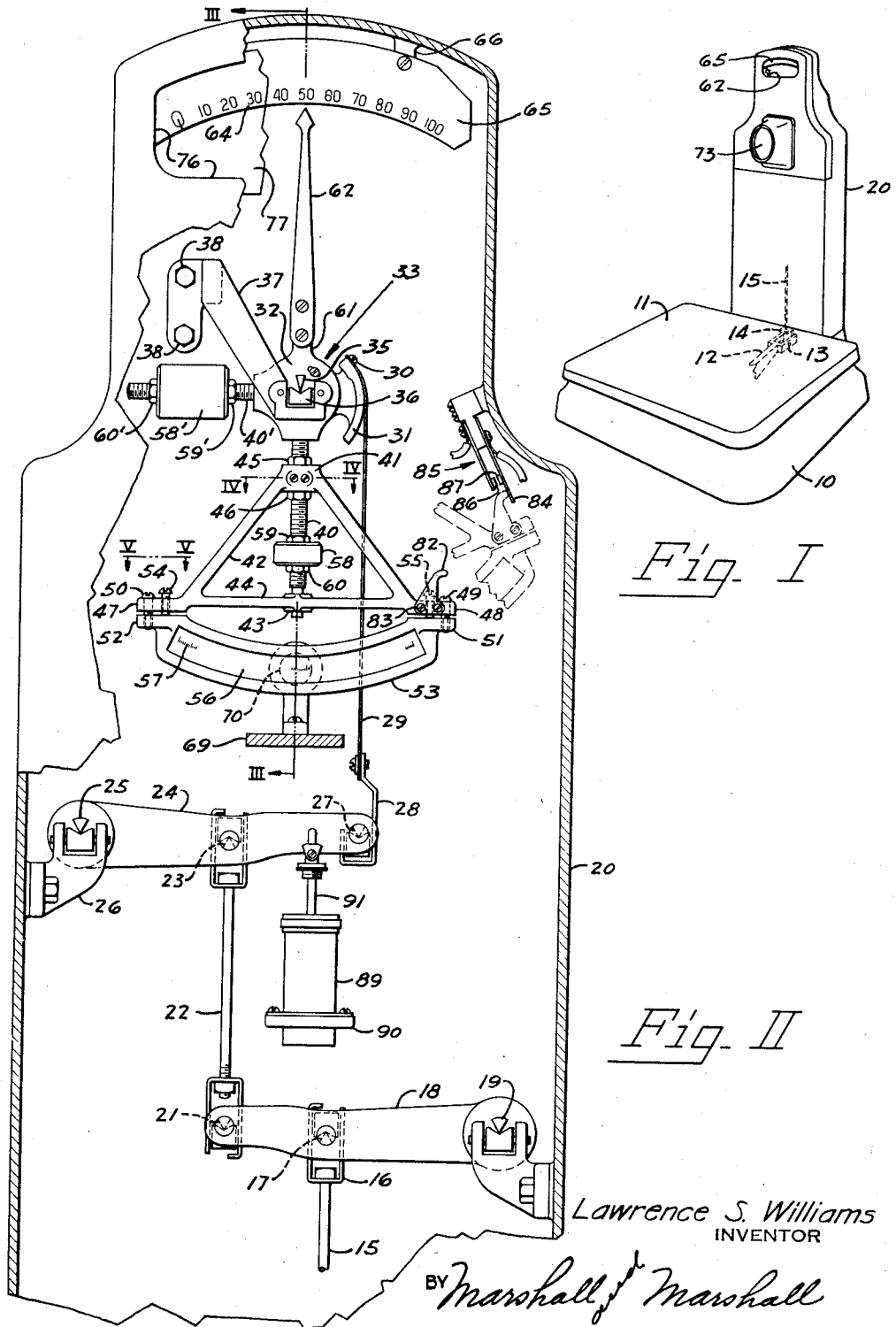
Fig. I
Fig. II
Lawrence S. Williams
INVENTOR
BY Marshall & Marshall
ATTORNEYS Oct. 8, 1940.   L. S. WILLIAMS   2,217,244
WEIGHING SCALE
Filed Nov. 10, 1939   2 Sheets-Sheet 2
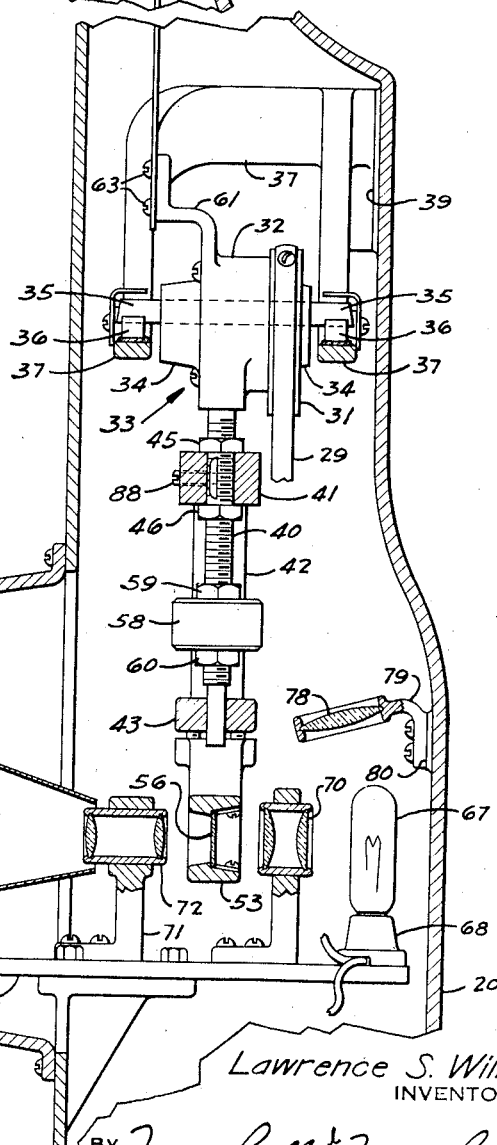
Lawrence S. Williams
INVENTOR
BY Marshall & Marshall
ATTORNEYS Patented Oct. 8, 1940

2,217,244

UNITED STATES PATENT OFFICE 2,217,244

WEIGHING SCALE

Lawrence S. Williams, Toledo, Ohio, assignor to Toledo Scale Company, a corporation of New Jersey Application November 10, 1939, Serial No. 303,804

11 Claims. (Cl. 265—62)

This application is a continuation-in-part of co-pending U. S. application Serial No. 241,438—filed Nov. 19th, 1938.

This invention relates generally to weighing scales having automatically acting indicating means, and more specifically to scales in which the indication is optically projected. In scales of this type constructed heretofore it is impossible for the operator to read the indication while the scale is in motion since due to the high magnification of the microscopic figures on the transparent chart the projected images result in a continuous blur and it is necessary for the operator to periodically interrupt the material feed and allow the scales to come to rest to observe how closely the load is approaching the predetermined quantity.

Furthermore, weights and measures authorities require that the zero indication be visible at all times. This requires that the electric light source be in operation continuously even when the scale is not in use, this prevents the use of a switch which automatically interrupts the current when the scale reaches its zero balance position.

The principal object of this invention is therefore the provision of improved means for eliminating heretofore common faults in scales of the type described.

Another object is the provision of improved means for visually indicating simultaneously the weight of a load by optical and by non-optical means.

Another object is the provision of improved means for illuminating both indications from a single light source.

Still another object is the provision of improved micrometric means for adjusting the position of the transparent projecting chart; and, A still further object is the provision for indicating simultaneously substantially identical indications within a restricted field of the vision of the operator.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is a perspective view of a scale embodying the invention.

Fig. II is an enlarged, fragmentary front elevational view, parts being broken away and parts in section showing in detail the load counterbalancing mechanism.

Fig. III is an enlarged, fragmentary side elevational view, sectioned substantially along the line III—III of Fig. II.

Fig. IV is a fragmentary section along the line IV—IV of Fig. II; and,

Fig. V is an enlarged, fragmentary plan view of chart frame adjusting means substantially as seen from along the line V—V of Fig. II.

Referring to the drawings in detail:

The scale constructed according to the invention comprises a base 10 containing the usual load supporting lever mechanism (not shown) and a platform 11 which in the known manner rests on the lever mechanism. A nose 12 of the lever mechanism, provided with a pivot 13, engages a stirrup 14 on the lower end of a lever connecting rod 15 whose upper end, by means of a suitable stirrup 16, engages a load pivot 17 of a lever 18 fulcrumed at 19 in the interior of a housing 20 bolted to a stationary deck of the base 10. A power pivot 21 of the lever 18 engages a suitable stirrup on the lower end of a connecting rod 22 whose upper end, also provided with a stirrup, engages a load pivot 23 of a pendulum lever 24 rockably mounted by means of a fulcrum pivot 25 upon suitable bearings fixed in a bracket 26, and a power pivot 27 in the lever 24 engages a stirrup 28 secured to the lower end of a flexible metallic ribbon 29 whose upper end overlies and is fastened at 30 to the arcuate face of a power sector 31.

This power sector 31 is adjustably secured to a pendulum body 32 of a load counterbalancing pendulum 33. Laterally extending bosses 34 of the pendulum body 32 are provided with fulcrum pivots 35 which rest upon V-grooved bearings 36 in bifurcated arms of a bracket 37 secured by means of bolts 38 to a boss 39 on one of the walls of the housing 20.

While in the illustrated embodiment the pendulum is shown and described as being mounted upon knife edge pivots probably at times it will be desirable to substitute a ground shaft and mount the ends of this shaft in ball bearings.

Dependingly fastened in the pendulum body 32 is a pendulum stem 40 which freely passes through a substantially cylindrical portion 41 of an A shaped frame 42. The lower end of this pendulum stem is provided with a turned tennon which projects into an accurately reamed hole in a boss 43 on a cross bar 44 of the A shaped frame 42. The frame 42 is roughly adjusted to position and locked in place by nuts 45 and 46. The lower ends of the frame 42 are provided with outwardly directed projections 47 and 48 having vertically directed holes through which screws 49 and 50 project. The lower ends of these screws 49 and 50 are threaded into projections 51 and 52 of a chart frame 53. The projections 47 and 48 also have holes in which screws 54 and 55 are threaded, the ends of these screws engage the upper surfaces of the projections 51 and 52, and their purpose is to securely lock the chart frame 53. A transparent member 56, provided with a series 57 of weight graduations and the corresponding designating numerals, is securely positioned and retained in an arcuate opening of the chart frame 53. Extending laterally from the pendulum body 32 is a threaded stem 40' upon which is adjustably mounted a weight 58'. The dead weight of the A shaped frame 42, of the chart frame 53 and the weight 58' and a weight 58, threaded on the stem 40, forms a pendulated mass. For the purpose of varying the counterbalancing capacity of the pendulum and for adjusting its centroid the weights 58 and 58' are adapted to be adjusted on their respective stems 40 and 40' and to be locked in adjusted position by means of nuts 59, 60 and 59', 60'.

The pendulum body 32 is further provided with an upwardly extending bracket 61 having a vertical face to which an indicator 62 is fastened by means of screws 63. The end of this indicator is adapted to cooperate with a series of indicia 64 marked on a chart 65 made from opaque material and secured to bosses 66 extending inwardly from the rear wall of the housing 20. This upwardly extending bracket 61 may be an integral portion of the pendulum body 32 as shown, or it may be adjustably attached thereto. It is desirable that the end of the indicator 62 and the chart 65 lie in a common vertical plane to avoid parallax in reading the indications. The series 64 of indicia in capacity is similar to the series 57 on the transparent chart 56 but while the series 57 contains all the weight graduations and designating numerals for example, by pounds or fractions thereof, the series 64 need contain only graduations and designating numerals of larger increments, for example, the zero graduation and every 25 or 50 lb. increment. In fact, no weight graduations need be provided with the exception of the zero mark; however, such numerals or other indicia as are provided should be accurately spaced.

Spaced rearwardly of the transparent chart 56 is a source of light 67, preferably a projecting lamp of the kind having a concentrated filament. This lamp 67 is mounted in a socket 68 on a shelf 69 extending between the front and rear walls of the housing 20. Disposed in front of the lamp 67 is a condensing lens system 70 and stationed in the optical axis of the condensing lens on the opposite side of the chart 56 in a bracket 71 is a tube 72 containing a suitable objective lens system for projecting an illuminated image of a portion of the graduations 57 on the chart 56 upon a translucent screen 73 suitably positioned in an opening in the front of the housing 20. For the purpose of providing an index for the projected indication a bracket 74 is secured to the shelf 69 and equipped with a pointer 75 which extends vertically into the optical axis of the projecting system so that its shadow is also projected in proper position on the screen 73.

To enable the indicia 64 on the chart 65 to be visible at all times the front wall of the housing 20 is provided with an opening 76 which in the known manner is covered by a pane of glass 77.

Although the opening 76 is closely adjacent the chart 65 and the illumination of the room is generally sufficient to illuminate this chart 65 it is sometimes desirable to throw additional illumination thereon. For this purpose, a condensing lens 78 is mounted on a bracket 79 fastened to a boss 80 on the rear wall of the housing 20, above the lamp 67, to collect and direct rays from this lamp 67 to a reflector 81 mounted at the proper angle adjacent this chart 65 so that it may in turn reflect light on the chart.

Adjustably secured to the projection 48 of the frame 42 is a small arm 82 of dielectric material which after adjustment is locked by a screw 83. The end of this arm is adapted to contact a spring switch blade 84 of a normally closed switch 85 in the circuit which supplies electric current to the lamp. The arm is adjusted so that it just opens contacts 86 and 87 when the scale is at zero with no load on the platform, and disengages from the blade 84 the instant a small load is placed on the platform of the scale thus closing the circuit and lighting the lamp.

In a projecting system of the type herein described it is necessary that the distance between the indicia bearing chart 56 and the objective lens system 72 does not vary during the movement of the pendulum. To obtain this required constancy it is necessary that the chart be very accurately aligned. For this purpose the cylindrical portion 41 of the A frame 42 is provided with drilled apertures in which screws 88 are threaded. The ends of these screws engage walls of grooves which are milled in the pendulum stem 40 (see Fig. IV). By loosening the lock nut 45 slightly and backing out one of the screws 88 and tightening the other the position of the A frame 42, with the thereto attached chart frame 53, may be very accurately adjusted in respect to a vertical plane passing through the pendulum stem. When the adjustment of these members is obtained the lock nut 45 is again tightened. It is also necessary that the radial point of the series 57 on the chart be coincident with the turning axis of the pendulum. This may be accomplished, as is obvious, by loosening either the screws 49 and 50 and tightening the screws 54 and 55 or vice versa. It is also obvious that a greater amount of adjustment in the vertical position of the two frames 42 and 53, when required, may be made by loosening or tightening the nuts 45 and 46.

For the purpose of damping the vibrations of the scale in the illustrated embodiment a dashpot 89, mounted on a bracket 90, secured to one of the walls of the housing 20, is provided. The usual dashpot plunger is connected by means of a rod 91 to the pendulum lever 24.

From the foregoing description the operation of the device will be apparent to anyone versed in the art. When a load is placed on the platform 11 its "pull" is transmitted through the nose pivot 13, the rods 15 and 22 and the levers 18 and 24 to the flexible metallic ribbon 29 and through it to the power sector 31 of the pendulum. This pendulum immediately moves laterally and upwardly until its weight moment counterbalances the weight moment of the load on the platform. The movement of the pendulum from its zero position immediately causes the switch operating arm 82 to disengage from the blade 84 and the contacts 86 and 87 engage and close the circuit energizing the lamp 67. This instantly causes a magnified image of the microscopic indicia on the chart 56 to be projected upon the screen 73 together with a shadow of the index 75 which now forms a datum line.

As hereinbefore stated, these indications are not readable on the screen until the scale is at rest but the indicator 62, which functions as an integral part of the pendulum, also moves through the same angle as the chart 56 and its movement over the series of indicia 64 on the chart 65 may be observed by the operator of the scale and the position of the indicator 62 in relation to the indicia on the chart 65 is adapted to give the operator of the scale an indication of the amount of the load on the platform while the scale is in motion and before it comes to rest. While this auxiliary indicating means is necessary in scales for determining predetermined amounts of load, for example, in filling containers with material from a bin, it is also advantageous in many other weighing operations. While the arrangement of a stationary chart and a movable indicator is preferred since the relative position of the indicator to the zero mark gives a readily comprehensible indication of the approximate amount of load on the scale without actually noting the corresponding designating weight numerals it is, however, at times desirable to mount the chart on the pendulum and to stationarily locate an index so that a lens may be suitably positioned to magnify the indication. It should be obvious however that this reversal is not a departure from the present invention.

It was previously mentioned herein that the requirements of the weights and measures authorities of the several states of this country, as well as similar authorities of most other countries, require that the zero balance indication be visible at all times. In a projecting scale this requires that the projecting lamp be illuminated constantly preventing the use of an automatically acting switch which interrupts the current when the scale reaches the zero balance position. A constantly burning light in a device of the type referred to is objectionable for two reasons; firstly, in that it wastes electric current and, secondly the heat of the concentrated light on the chart is injurious to the photographic film which carries the indicia on the transparent plate. In a scale constructed according to the present invention the indicator 62, when the scale is at rest registers with the zero indicium on the chart 65 and gives an indication which may be observed by the operator at all times even when the projecting means are inoperative. Since the indicator 62 and the chart 56 function as integral members of the pendulum and rock through the same angle the indicator 62 will give an indication identical with that projected by the optical means.

While the invention is shown embodied in a self-contained scale it must be understood that it may be modified so that it may be attached to existing scales which do not have an automatic indication, such as the common beam scale, and in fact it must be understood that the invention is susceptible to variation, modification and change within the spirit and scope of the subjoined claims.

Having described the invention, I claim:

1. In a weighing scale, in combination, load receiving means, load counterbalancing means operatively connected thereto, a housing for enclosing said load counterbalancing means, a plurality of openings in said housing, a transparent indicia bearing chart mounted on said load counterbalancing means, a directly visible indicia bearing chart stationarily mounted in said housing adjacent one of said openings, a screen mounted in another of said openings, an index stationed adjacent said screen, optical means for projecting magnified images of said indicia borne by said transparent chart and said index on said screen and an indicator secured to said load counterbalancing means for cooperation with said directly visible chart and visible through said first mentioned opening.

2. In a weighing scale, in combination, means for receiving a load to be weighed, a pendulum for counterbalancing said load, a plurality of indicating means for simultaneously giving substantially identical indications of the weight of said load, a screen, an index, said plurality of indicating means comprising a transparent indicia bearing chart secured to said pendulum substantially adjacent said screen, an opaque indicia bearing chart, an indicator secured to said pendulum for cooperation with said opaque indicia bearing chart and a lamp for projecting an image of a portion of said transparent chart and said index upon said screen and for intensifying the illumination of said opaque chart.

3. In a weighing scale, in combination, load counterbalancing means including a pendulum, a stem secured to said pendulum and a substantially sector-like frame adjustably mounted on said stem, said sector-like frame having openings, a transparent indicia bearing chart mounted in one of said openings and a pendulum weight adjustably mounted in another opening of said frame, a screen, an index, optical means for projecting magnified images of said indicia borne by said transparent chart and said index upon said screen, means for adjusting said substantially sector-like frame on said pendulum in a plurality of directions and a relatively movable directly visible indicia bearing chart and indicator cooperating with said pendulum and said visible indicia bearing chart to simultaneously give substantially identical indications.

4. In a weighing scale, in combination, load receiving means, load counterbalancing means and an operative connection between said load receiving means and said load counterbalancing means, said load counterbalancing means including a pendulum, a stem secured to said pendulum, a frame adjustably mounted on said stem, a second frame, a transparent indicia bearing chart secured to said second frame and means for adjustably securing said second frame to said frame mounted on said stem, said means for adjustably securing said second frame to said first mentioned frame comprising manipulative means disposed at each end of said frames, each of said manipulative means being adapted for independent manipulation, said manipulative means comprising push and pull screws.

5. In a weighing scale, in combination, load receiving means, load counterbalancing means and an operative connection between said load receiving means and said load counterbalancing means, said load counterbalancing means including a pendulum, a stem secured to said pendulum, a frame adjustably mounted on said stem, a second frame, a transparent indicia bearing chart secured to said second frame and means for adjustably securing said second frame to said frame mounted on said stem, and means for adjustably securing said second frame to said first mentioned frame comprising manipulative means disposed at each end of said frames, each of said manipulative means being adapted for independent manipulation.

6. In a weighing scale of the type described, in combination, the subcombination of a load counterbalancing pendulum, a pendulum stem, a transparent indicia bearing chart mounted on said stem, a screen, optical projecting means for projecting a magnified image of a portion of said indicia borne by said transparent chart upon said screen, a directly visible indicia bearing chart and an indicator fixedly secured to said pendulum for cooperation with said directly visible indicia bearing chart to simultaneously give a visual indication corresponding to the indication projected upon said screen, said chart and said screen being located so as to be simultaneously observable by a single observer.

7. In a weighing scale, in combination, a movable pendulum, a transparent indicia bearing chart mounted on said pendulum, a screen, an index, optical means for projecting magnified images of said indicia borne by said chart upon said screen, a directly visible indicia bearing chart and an indicator secured to said pendulum for cooperation with said directly visible chart for simultaneously indicating an indication corresponding to that projected upon said screen.

8. In a weighing scale, in combination, a movable member, a load counterbalancing pendulum, a transparent indicia bearing chart mounted on said pendulum, a connection between said pendulum and said movable member, a screen, optical means for projecting said indicia borne by said chart upon said screen and a relatively movable directly visible indicia bearing chart and indicator operated by said pendulum and cooperating with each other to simultaneously give visual indications corresponding to those projected upon said screen.

9. In a weighing scale, in combination, a movable member, a load counterbalancing pendulum, a transparent indicia bearing chart mounted on said pendulum, a connection between said pendulum and said movable member, a screen, an index, optical means including a lamp for projecting images of said chart indicia and said index upon said screen, a relatively movable directly visible indicia bearing chart and indicator, said indicator connected to said pendulum and cooperating with said directly visible chart to simultaneously give a visual indication corresponding to that projected upon said screen and means whereby said lamp illuminates said directly visible chart.

10. In a weighing scale, in combination, a movable member, a load counterbalancing pendulum, a transparent indicia bearing chart mounted on said pendulum, a connection between said pendulum and said movable member, a screen, an index, optical means including a lamp for projecting magnified images of said chart indicia and said index upon said screen, a relatively movable directly visible indicia bearing chart and indicator operated by said pendulum to simultaneously give a visual indication corresponding to that projected upon said screen, means for illuminating said directly visible chart by said lamp, said means comprising a reflector.

11. In a weighing scale, in combination, a movable member, a load counterbalancing pendulum, an indicia bearing transparent chart mounted on said pendulum, a connection between said pendulum and said movable member, a screen, an index, optical means including a lamp for projecting magnified images of said chart indicia and said index upon said screen, a relatively movable directly visible indicia bearing chart and indicator operated by said pendulum to simultaneously give a visual indication corresponding to that projected upon said screen and means whereby said lamp illuminates said directly visible chart, said means comprising a reflector and optical means for directing light from said lamp to said reflector.

LAWRENCE S. WILLIAMS.